United States Patent
Bochkati

(10) Patent No.: US 12,039,293 B2
(45) Date of Patent: Jul. 16, 2024

(54) METHOD, SYSTEM, AND CIRCUIT FOR GENERATING TOOLCHAINS AGNOSTIC LINKER SCRIPTS

(71) Applicant: STMicroelectronics France, Montrouge (FR)

(72) Inventor: Tarek Bochkati, Ariana (TN)

(73) Assignee: STMicroelectronics France, Montrouge (FR)

( * ) Notice: Subject to any disclaimer, the term of this patent is extended or adjusted under 35 U.S.C. 154(b) by 49 days.

(21) Appl. No.: 17/961,927

(22) Filed: Oct. 7, 2022

(65) Prior Publication Data
US 2024/0118871 A1    Apr. 11, 2024

(51) Int. Cl.
*G06F 8/30* (2018.01)
(52) U.S. Cl.
CPC .................................. *G06F 8/30* (2013.01)
(58) Field of Classification Search
CPC ........................................................ G06F 8/30
See application file for complete search history.

(56) References Cited

U.S. PATENT DOCUMENTS

| | | | |
|---|---|---|---|
| 6,658,646 B1 * | 12/2003 | Hernandez, III | G06F 9/45512 717/114 |
| 2003/0208723 A1 * | 11/2003 | Killian | G06F 30/30 716/102 |
| 2007/0050762 A1 * | 3/2007 | Chen | G06F 8/71 717/169 |
| 2007/0079306 A1 * | 4/2007 | Qumei | G06F 9/44521 717/168 |
| 2010/0088688 A1 * | 4/2010 | Edwards | G06F 8/4442 711/E12.001 |

FOREIGN PATENT DOCUMENTS

DE    102012016539 A1 *    5/2014    ......... G05B 19/0426

OTHER PUBLICATIONS

Bertolotti, "RTOS Support in C-Language Toolchains" (Year: 2017).*
(Continued)

*Primary Examiner* — Phillip H Nguyen
(74) *Attorney, Agent, or Firm* — Seed IP Law Group LLP

(57) ABSTRACT

System, method, and circuitry for generating a linker model for use by a toolchain associated with a programmable computing device. One or more regions in the memory resources available to the programmable computing devices is defined for used by an application executing on the programmable computing device. One or more sections is defined for those regions for use by the application. Resource boundaries are generated for the application based on the defined regions and the defined sections. A user is enabled to modify the defined regions or the defined sections or the generated resource boundaries. A linker model is then generated based on the available memory resources, the defined regions, the defined sections, and the generated resource boundaries. This linker model is then utilized to generate a linker script for the programmable computing device based the linker syntax compatible with a toolchain linker for the programmable computing device.

20 Claims, 10 Drawing Sheets

(56) References Cited

OTHER PUBLICATIONS

Wilkens, "Optimizing the LLVM ELF linker for a distributed compilation environment" (Year: 2020).*
Bill Gatliff, "Embedding with GNU: The GNU compiler and linker" (Year: 2000).*
Daniela Genius, "System-Level Design and Virtual Prototyping of a Telecommunication Application on a NUMA Platform" (Year: 2018).*

* cited by examiner

APPLICATION MEMORY LAYOUT EDITOR

MEMORIES

| NAME | TYPE | ADDR | SIZE | ALIAS OF | DESC |
|---|---|---|---|---|---|
| FLASH | ROM | 0X08000000 | 512K | | |
| SRAM | RAM | 0X20000000 | 192K | | |
| FLASH_S | | 0X0C000000 | | FLASH | |
| SRAM_S | | 0X30000000 | | SRAM | |

APPLICATIONS

SECURE APPLICATION

REGIONS

| NAME | MEMORY | OFFSET | SIZE | DESC |
|---|---|---|---|---|
| ROM | FLASH_S | <COMPUTED> | 248K | |
| ROM_NSC | FLASH_S | <COMPUTED> | 8K | |
| RAM | SRAM_S | <COMPUTED> | 96K | |

SECTIONS

| NAME | TYPE | REGION | SIZE | LOAD FROM |
|---|---|---|---|---|
| .ISR_VECTOR | VTABLE | ROM | | |
| .TEXT | RO CODE | ROM | | |
| .RODATA | RO DATA | ROM | | |
| .DATA | DATA | RAM | | ROM |
| .BSS | BSS | RAM | | |
| .HEAP | HEAP | RAM | 0X200 | |
| .STACK | STACK | RAM | 0X400 | |
| .SECURE_GATEWAY | CMSE | ROM_NSC | | |

| NON-SECURE APPLICATION | | | | |
|---|---|---|---|---|
| REGIONS | | | | |
| NAME | MEMORY | OFFSET | SIZE | DESC |
| ROM | FLASH | <COMPUTED> | <COMPUTED> | |
| RAM | SRAM | <COMPUTED> | <COMPUTED> | |
| SECTIONS | | | | |
| NAME | TYPE | REGION | SIZE | LOAD FROM |
| .ISR_VECTOR | VTABLE | ROM | | |
| .TEXT | RO CODE | ROM | | |
| .RODATA | RO DATA | ROM | | |
| .DATA | DATA | RAM | | ROM |
| .BSS | BSS | RAM | | |
| .HEAP | HEAP | RAM | 0X200 | |
| .STACK | STACK | RAM | 0X400 | |

GUI | XML

FIG. 7B

METHOD, SYSTEM, AND CIRCUIT FOR GENERATING TOOLCHAINS AGNOSTIC LINKER SCRIPTS

BACKGROUND

Technical Field

The present disclosure generally relates to electronic devices of the type often used in embedded applications. More particularly, but not exclusively, the present disclosure relates to generating linker scripts for use in programming such electronic devices.

Description of the Related Art

Many programmable microcontroller and microprocessor architectures utilize specific code to initialize or configure operation of the microcontroller and microprocessor in a manner desired by the user. This code can establish a desired clock setup, assign peripherals, embed software that is to execute on the microcontroller or microprocessor, and prepare other software or hardware configuration settings. To generate such code, a user would have to be trained on the specific code or hardware nuances of the microcontroller or microprocessor, which can vary from one architecture to another. Likewise, difference microcontrollers or microprocessors may utilize different toolchains to enable application-level code to execute on the microcontroller or microprocessor. These tools, however, are often rigid and do not provide the user with a great deal of flexibility in making their code executable in different environments. It is with respect to these and other considerations that the embodiments described herein have been made.

BRIEF SUMMARY

Embodiments described herein utilize a graphical user interface to enable a user to generate a linker model for one or more applications independent of the linker syntax utilized and defined by a toolchain linker for a programmable computing device. A request to use an application on a programmable computing device is received. Memory resources that are available to the programmable computing device are determined. One or more regions in the memory resources used by the application and one or more sections in the one or more regions for use by the application are defined, such as by user input via a graphical user interface. Resource boundaries are generated for the application based on the one or more defined regions and the one or more defined sections. The user is enabled to modify the one or more defined regions or the one or more defined sections or the generated resource boundaries. A linker model is then generated based on the memory resources, the one or more defined regions, the one or more defined sections, and the generated resource boundaries, such that a linker script can be generated for the programmable computing device based on the linker model and a linker syntax compatible with a toolchain linker for the programmable computing device. The linker script may then be used to generate applications for deployment on the programmable computing device.

Embodiments described herein result in an agnostic toolchain generator that uses a generic linker model having user-defined regions and user-defined sections for one or more applications to be executed on a programmable computing device. This agnostic toolchain generator results in a more efficient deployment of applications on one or more programmable computing devices that utilize different linker syntax, which also results in a more efficient use of resources of the programmable computing devices.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views, unless the context indicates otherwise. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIGS. 5A-5B is a class diagram that shows a linker model composition as generated by a system agnostic toolchain in accordance with embodiments described herein and FIGS. 6, 7A, and 7B are illustrative examples of graphical user interfaces that enable a user to view, select, and modify memory resource utilization in accordance with embodiments described herein.

DETAILED DESCRIPTION

In the following description, along with the accompanying drawings, certain details are set forth in order to provide a thorough understanding of various embodiments of devices, systems, methods, and articles. One of skill in the art, however, will understand that other embodiments may be practiced without these details. In other instances, well-known structures and methods associated with, for example, circuits, such as transistors, multipliers, adders, dividers, comparators, integrated circuits, logic gates, finite state machines, accelerometers, gyroscopes, magnetic field sensors, memories, bus systems, etc., have not been shown or described in in detail in some figures to avoid unnecessarily obscuring descriptions of the embodiments. Moreover, well-known structures or components that are associated with the environment of the present disclosure, including but not limited to the communication systems and networks, have not been shown or described in order to avoid unnecessarily obscuring descriptions of the embodiments.

Unless the context requires otherwise, throughout the specification and claims that follow, the word "comprise" and variations thereof, such as "comprising," and "comprises," are to be construed in an open, inclusive sense, that is, as "including, but not limited to."

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context clearly dictates otherwise. In addition, throughout the specification, the meaning of "a," "an," and "the" include singular and plural references. Furthermore, the particular features, structures, or characteristics may be combined in any suitable manner in one or more embodiments to obtain further embodiments.

Figure 1:
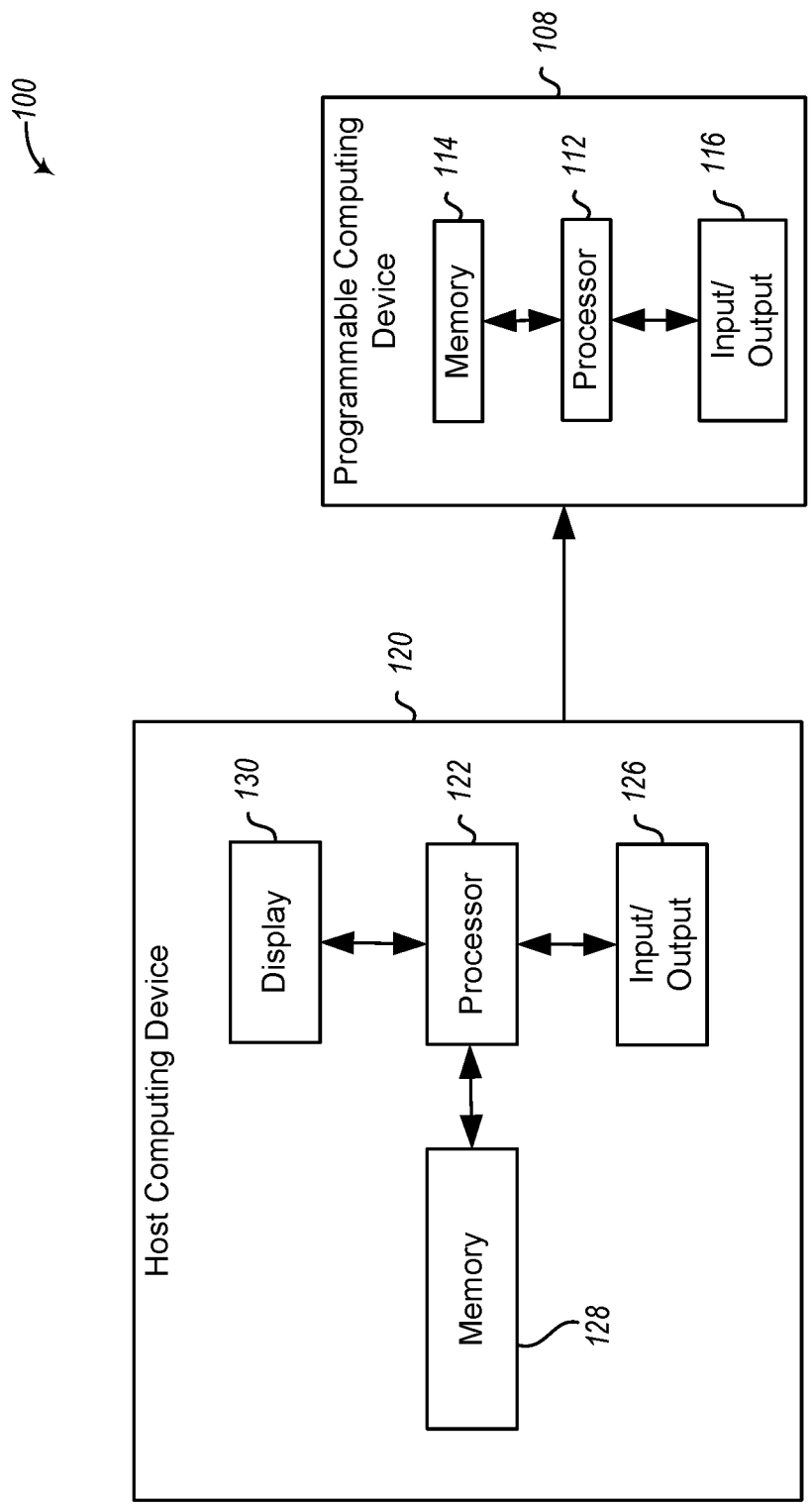
FIG. 1 is a block diagram showing an example computing environment for implementing embodiments described herein.

FIG. 1 is a block diagram showing an example computing environment 100 for implementing embodiments described herein. Environment 100 includes a programmable computing device 108 and a host computing device 120.

The programmable computing device 108 has a processor 112 and input/output peripherals 116. Although not illustrated, computing device 108 may have other computing components, such as one or more memories, graphics processing units, wireless network modules, analog-to-digital converters, microelectromechanical systems, other sensors, etc.

The programmable computing device 108 may be a microprocessor, microcontroller, or other computer device that is or contains an integrated circuit having a programmable interface. The processor 112 includes one or more central processing units or processor cores. In some embodiments, the processor 112 may include a state machine, a microprocessor, a programmable logic circuit, discrete circuitry, logic gates, registers, etc. The processor 112 may control overall operation of the programmable computing device 108, execution of applications programs by the programmable computing device 108, etc.

The programmable computing device 108 also includes one or more memories 114, such as one or more volatile or non-volatile memories, or a combination thereof, which may store, for example, all or part of instructions and data related to applications and operations performed by the programmable computing device 108. For example, the memory 114 may store computer instructions that when executed by the processor 112, cause the programmable computing device 108 to perform a desired function. The memory 114 may also store information that is used to configure the hardware of the programmable computing device 108

The input/output peripherals 116 may include one or more general purpose input/output pins, dedicated input or output interfaces (e.g., serial input/output ports), wireless interfaces, etc. In some embodiments, input/output peripherals 116 may be configured to receive input data from other computing devices or may be configured to provide output data to other computing devices.

The programmable computing device 108 may also include a bus system (not illustrated), which may be configured such that the processor 112, input/output peripherals 116, memories, or other circuits or circuitry (not illustrated) are communicatively coupled to one another to send or receive, or send and receive, data to or from other components. The bus system may include one or more of data, address, power, or control busses, or some combination thereof, electrically coupled to the various components of the programmable computing device 108.

The host computing device 120 includes a processor 122, an input/output interface 126, and a memory 128. In some embodiments, the host computing device 120 is configured to employ embodiments described herein to present a graphical user interface to a user, to enable the user to select applications to execute on the programmable computing device 108, define memory regions within the available memory 114, and define sections within those regions in which information is stored for the selected applications, as described herein.

In various embodiments, a toolchain performs cross compilation for a programmable computing device. In some embodiments, a toolchain may include an assembler, a complier, a linker, and other modules needed to convert make an application executable on a particular programmable computing device 108 or a particular type of programmable computing device. By employing embodiments described herein, the host computing device 120 can generate a linker model based on the user-defined regions and the user-defined sections, such that a linker file can be generated for the programmable computing device 108 based on the linker syntax for the toolchain linker for that programmable computing device (i.e., for the toolchain associated with that programmable computing device). The host computing device 120 can provide the linker file to the programmable computing device 108 for employment by the programmable computing device 108.

Processor 122 may include one or more processors that are configured to execute computer instructions to employ embodiments described herein.

Memory 128 may include one or more various types of non-volatile and/or volatile storage technologies. Examples of memory 128 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 128 may be utilized to store information, including computer-readable instructions that are utilized by processor 122 to perform actions, including embodiments described herein. Memory 128 may also store other information, which is discussed in more detail below in conjunction with FIG. 2.

Input/output interface 126 may include one or more other data input or output interfaces. For example, the input/output interface 126 may include or provide data to a display device 130, which can be used to present the graphical user interface to the user. The input/output interface 126 can accept input from the user to select and customize components, as described herein. Moreover, the input/output interface 126 is configured to provide content generated as described herein to the programmable computing device 108.

The operation of one or more embodiments will now be described with respect to FIGS. 2 and 3A-3B. In at least one of various embodiments, processes 200 and 300 described in conjunction with FIGS. 2 and 3A-3B, respectively, may be implemented by or executed on one or more computing devices, such as host computing device 120 in FIG. 1.

Figure 2:
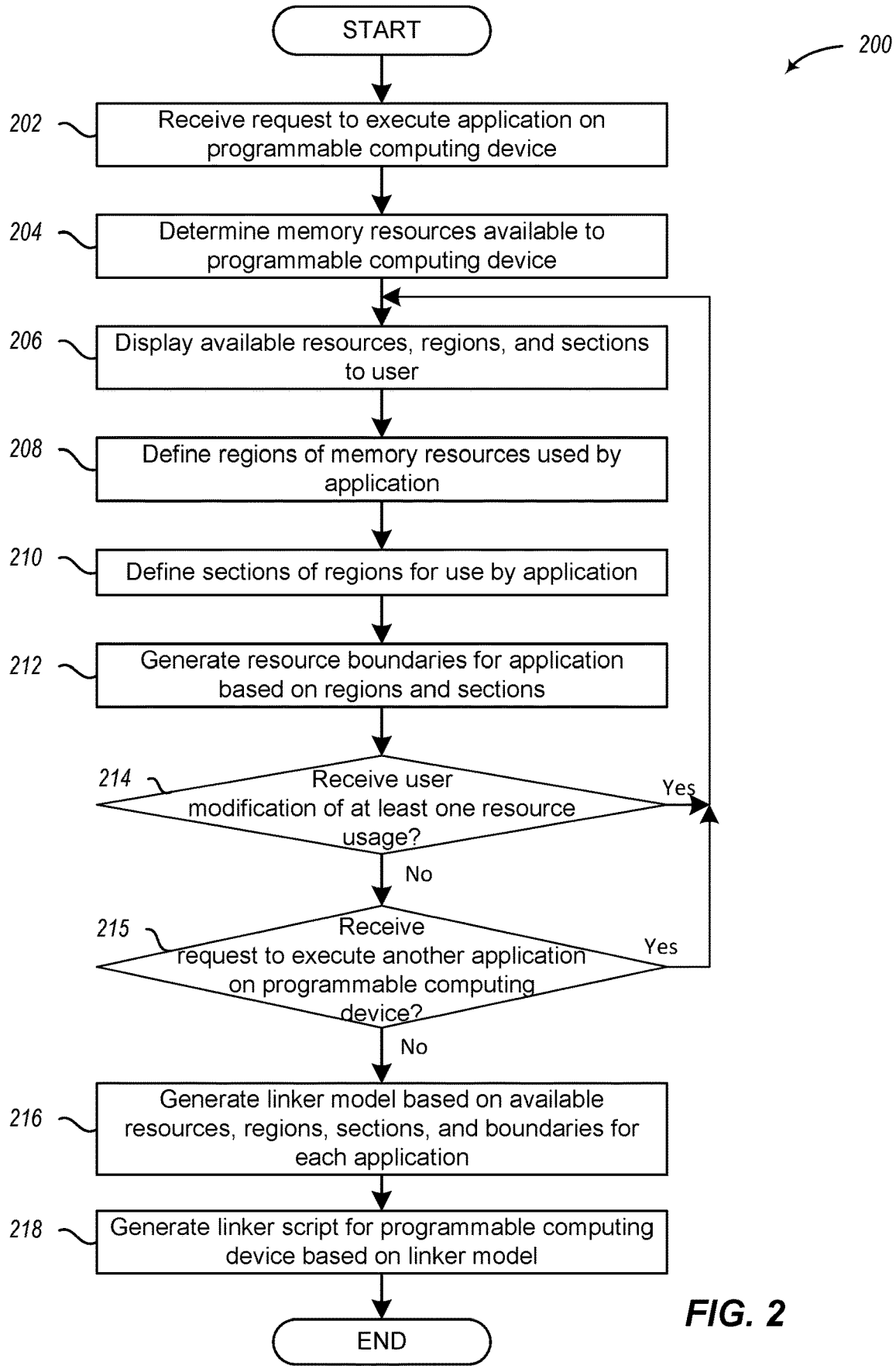
FIG. 2 shows a logical flow diagram of a process for employing a system agnostic toolchain in accordance with embodiments described herein.

FIG. 2 shows a logical flow diagram of a process 200 for employing a system agnostic toolchain in accordance with embodiments described herein. Process 200 begins, after a start block, at block 202, where a request is received to execute an application on a programmable computing device. An application is code, software, or other programmable action to be performed on or executed by the programmable computing device, such as programmable computing device 108 in FIG. 1.

In some embodiments, a graphical user interface is presented to a user such that the user can select a particular programmable computing device from among one or many possible programmable computing devices. Likewise, the user can select, input, or define the application.

Process 200 proceeds to block 204, where memory resources that are available to the programmable computing device are determined. The available memory resources may be internal memories, external memories, etc.

In some embodiments, available memory resources may include all memory that is accessible to the programmable computing device, e.g., ROM (Read-only Memory), RAM (Random Access Memory), CCMRAM (Core-coupled-memory RAM), Flash memory, SRAM (Static RAM), etc. In other embodiments, the available memory resources may include memory that is accessible by the programmable computing device and not already allocated for other applications or uses. In various embodiments, determining the available memory resources may also include determining a size of the memory, a location or starting address of the memory, etc.

In some embodiments, a database of available memories for a plurality of different programmable computing devices may be accessed. The particular memory that is available to the user-selected programmable computing device is then obtained from the database. In other embodiments, the user can input a list of the memory that is available to the programmable computing device. In yet other embodiments, the programmable computing device can be directly queried for an identification of the memory that it has available.

Process 200 continues at block 206, where the available resources are displayed to the user via a graphical user interface. In various embodiments, regions or sections previously defined by the user may also be displayed. For example, as regions and sections are defined by the user (as discussed in more detail below), the graphical user interface may be updated to display these regions or sections. Similarly, as boundaries are selected by the user or automatically generated for regions and sections, the graphical user interface may be updated to display the selected or generated boundaries.

Process 200 continues at block 208, where regions of the available memory resources are defined for use by the application. One or more of the regions may be defined for a particular type of available memory, one or more particular available memory resources, a particular size, a starting offset within an available memory resource, an address of the region, or other region parameters. Accordingly, a defined region may be an entire available memory resource or only a portion (but not all) of the available memory resource. In some embodiments, all of the available resources are used to define the regions. In other embodiments, a portion (but not all) of the available resources are used to define the regions. For example, assuming that the programmable computing device has a ROM, RAM, and flash memory available, the regions for the application may include the ROM, the RAM, the flash, the ROM and the RAM, the ROM and the RAM and the flash, or some other combination of available memories.

As described above, the available resources may be displayed to the user via a graphical user interface. The user can select, input, or otherwise define one or more regions using the graphical user interface. In some embodiments, the user may be presented with buttons, input boxes, or other code input interfaces to allow the user to define the one or more regions in the available resources. In some other embodiments, one or more of the regions may be defined based on the needs or expected memory usage of the application. For example, the application may include metadata that identifies the regions or types of regions of memory needed to execute.

Process 200 proceeds next to block 210, where one or more specific sections of the regions are defined for use by the application. The sections may be defined for a particular region, a particular size, a type of information to be stored in the section, a memory location from which the information is to be obtained, or other section parameters. Example sections may include, but are not limited to, text, data, bss, heap, stack, etc.

Similar to defining regions, the graphical user interface may be presented to the user such that the user can select, input, or otherwise define one or more sections within the previously defined regions. In some other embodiments, one or more of the sections may be defined based on the needs or expected memory usage of the application. For example, the application may include metadata that identifies the sections or types of sections of memory needed to execute.

Process 200 continues next to block 212, where resource boundaries are generated for the application. These resource boundaries include details regarding memory usage for each defined region and section. In some embodiments, the resource boundaries are defined based on default addresses or offsets within a region or for a particular memory resource based on the size of each defined region or section. As noted above, the user may input various parameters of one or more regions or sections, such as addresses, offsets, size, type of memory, etc. This information can be used to generate or identify the resource boundaries for each section or region.

In some embodiments, a consistency checker may be employed to determine if there are any memory allocation violations, such as overlapping regions or sections within the same application or from one application to another application, and to notify the user of those violations via the graphical user interface. In at least one embodiment, the resource boundaries may be automatically generated or automatically adjusted in accordance with the proper memory allocation for the available memory resources.

Process 200 proceeds to decision block 214, where a determination is made whether the user provided, defined, selected, or modified one or more of the resource usage. This resource usage may include a user modification to one or more regions, one or more sections, one or more memory boundaries, or some combination thereof. If the user provided at least one modification, process 200 loops to block 206 to continue to display the graphical user interface and enable the user to define or modify the regions, sections, or resource boundaries; otherwise, process 200 flows to decision block 215.

At decision block 215, a determination is made whether a request is received, such as via the graphical user interface, for another application to execute on the programmable computing device. If another application is to execute on the programmable computing device, process 200 loops to block 206 to display the available resources, regions, and selections for the applications to the user. In this way, the user can define or modify regions, sections, or resource boundaries for each separate application that is to execute on the programmable computing device. If another application is not selected, then process 200 flows from decision block 215 to block 216.

Figure 4:
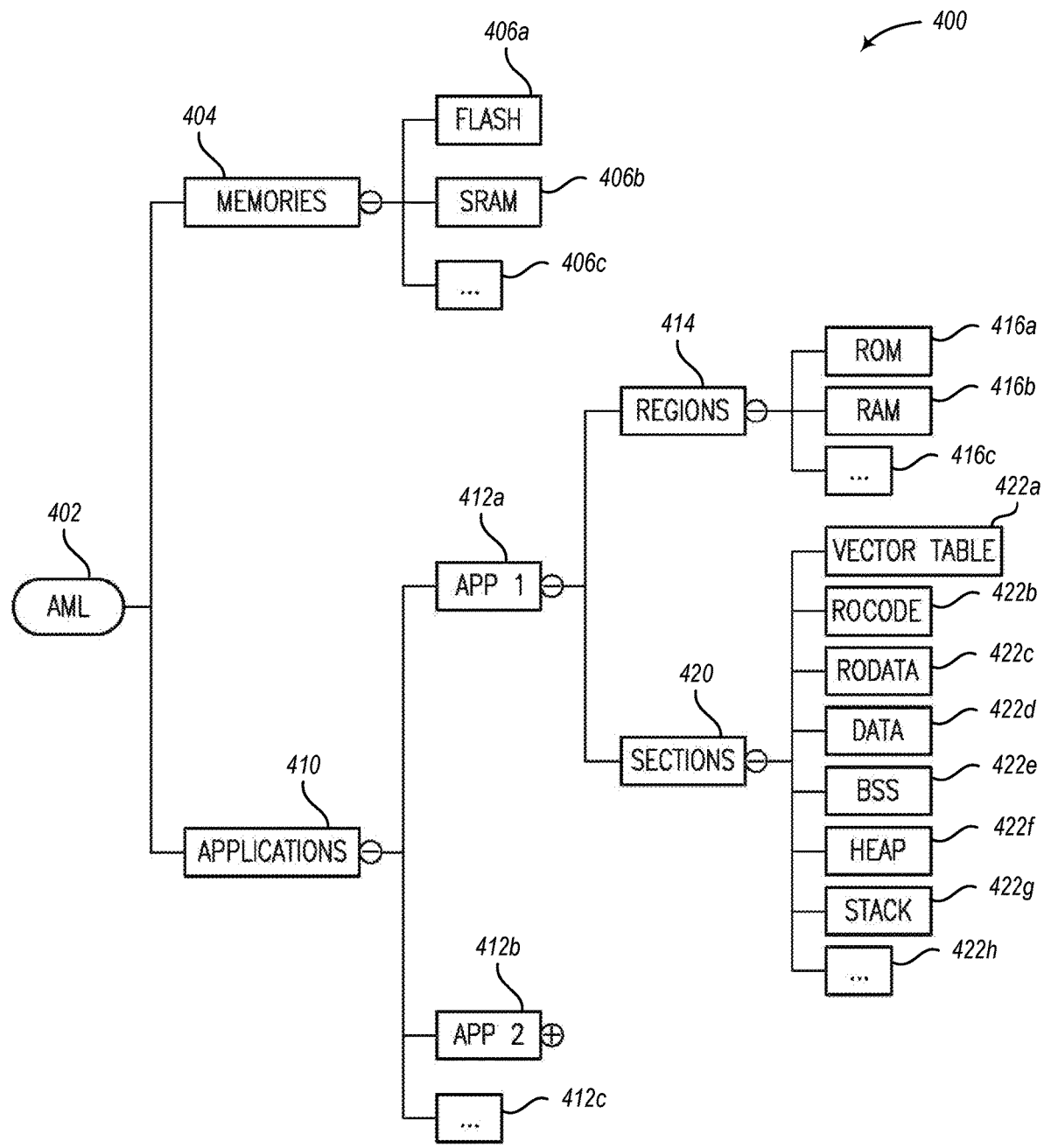
FIG. 4 is an illustrative example of a linker model generated by a system agnostic toolchain in accordance with embodiments described herein.
Figure 5A:
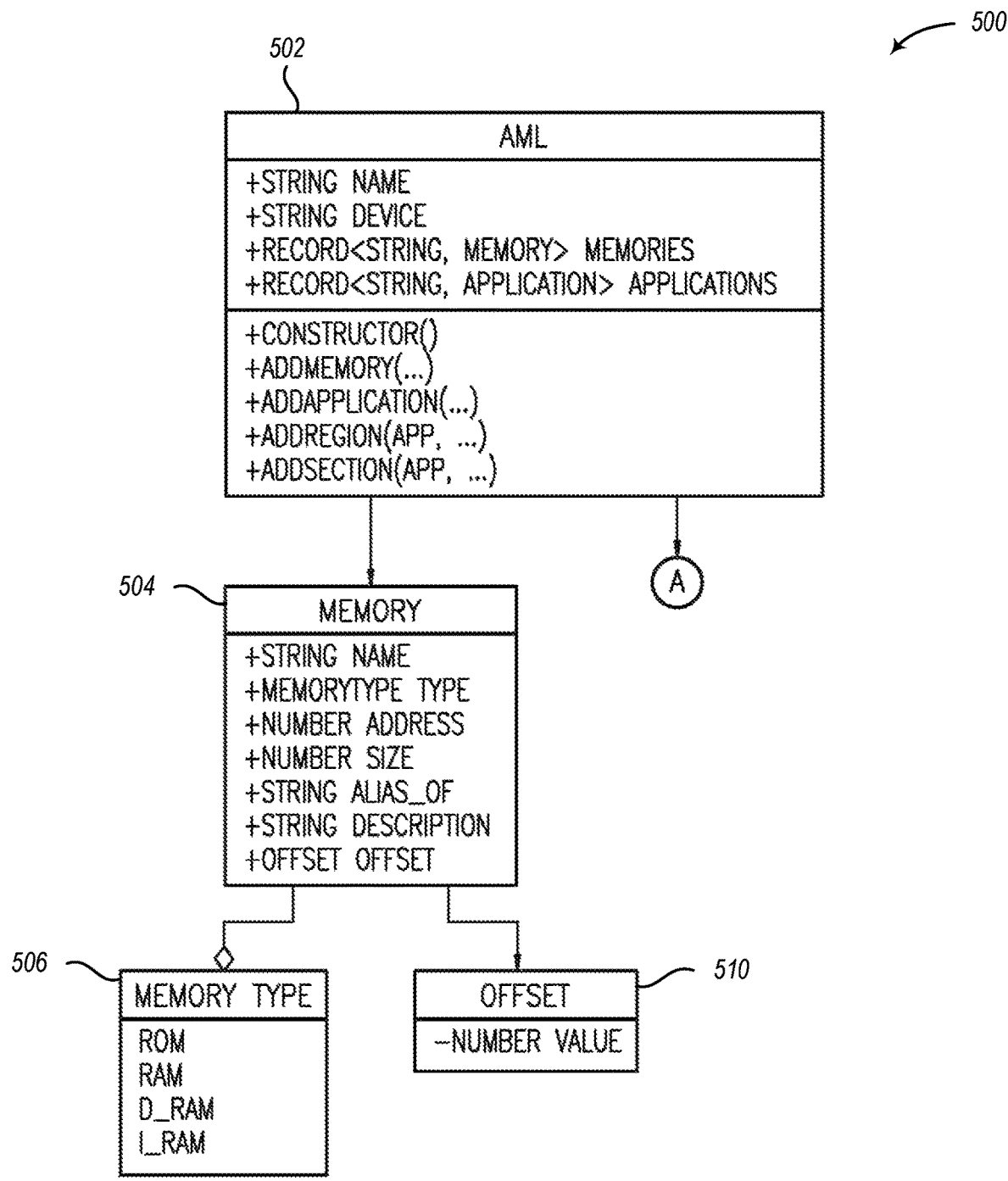
Figure 5B:
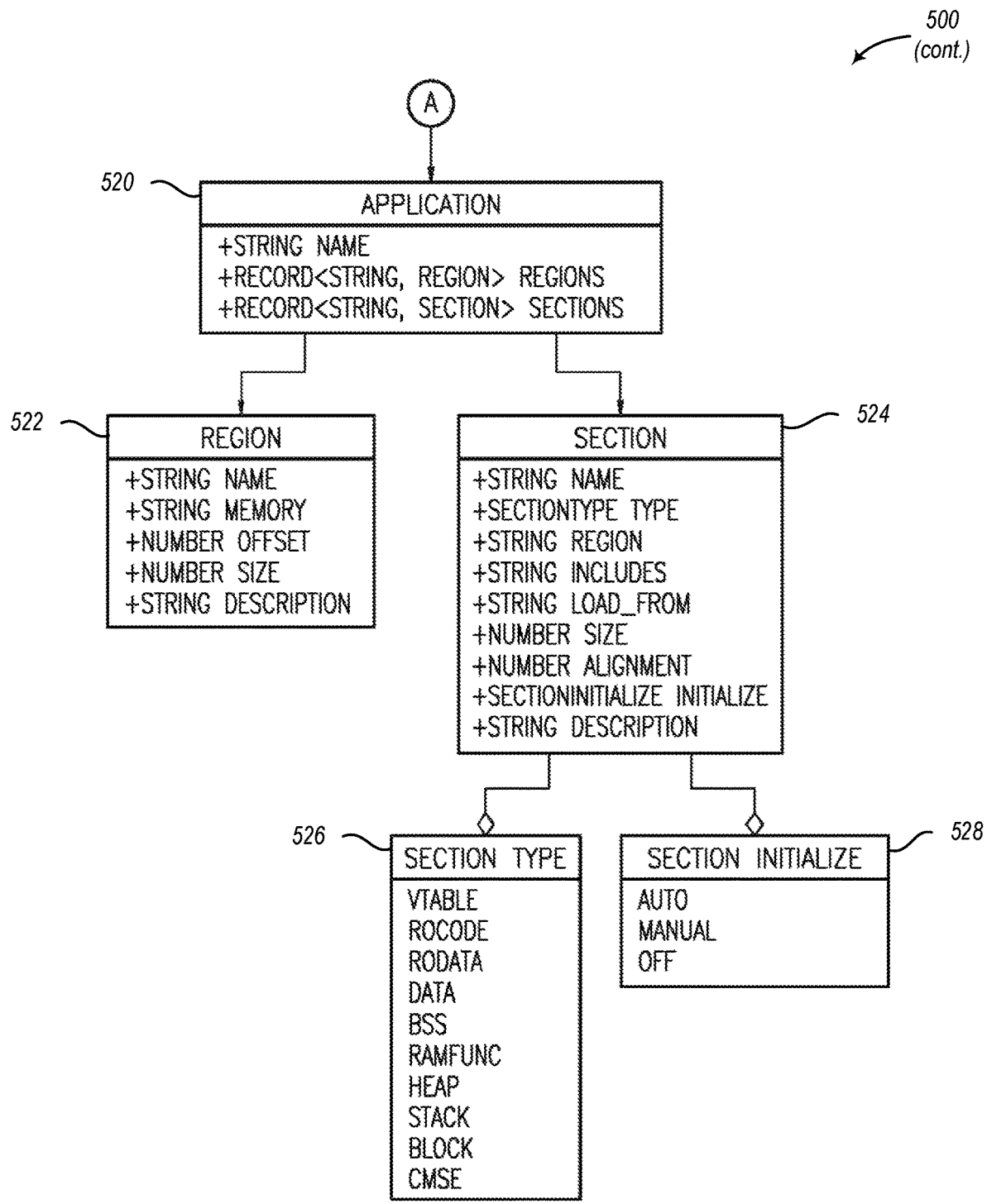

At block 216, a linker model is generated based on the available resources, defined regions, defined sections, and memory boundaries for each application that is to execute on the programmable computing device. The linker model is an abstraction, such as a tree structure or other data structure, of the application placement in the device resources (e.g., ROM, RAM, etc.) using a toolchain agnostic syntax. This linker model generically identifies the information that is defined or selected for each available resource, defined region, and defined section for each application. Examples of linker models are shown in FIGS. 4 and 5A-5B.

The linker model enables the system to generate a linker script for different computing environments and different toolchains that utilize different linker syntax. In this way, a user can generate the linker script for different toolchain linkers for the applications from the linker model without having to individually write the linker script for each different application for each different toolchain linker.

Process 200 continues next at block 218, where a linker script is generated for the programmable computing device based on the linker model, which is described in more detail below in conjunction with FIG. 3.

After block 218, process 200 terminates or otherwise returns to a calling process to perform other actions.

Figure 3A:
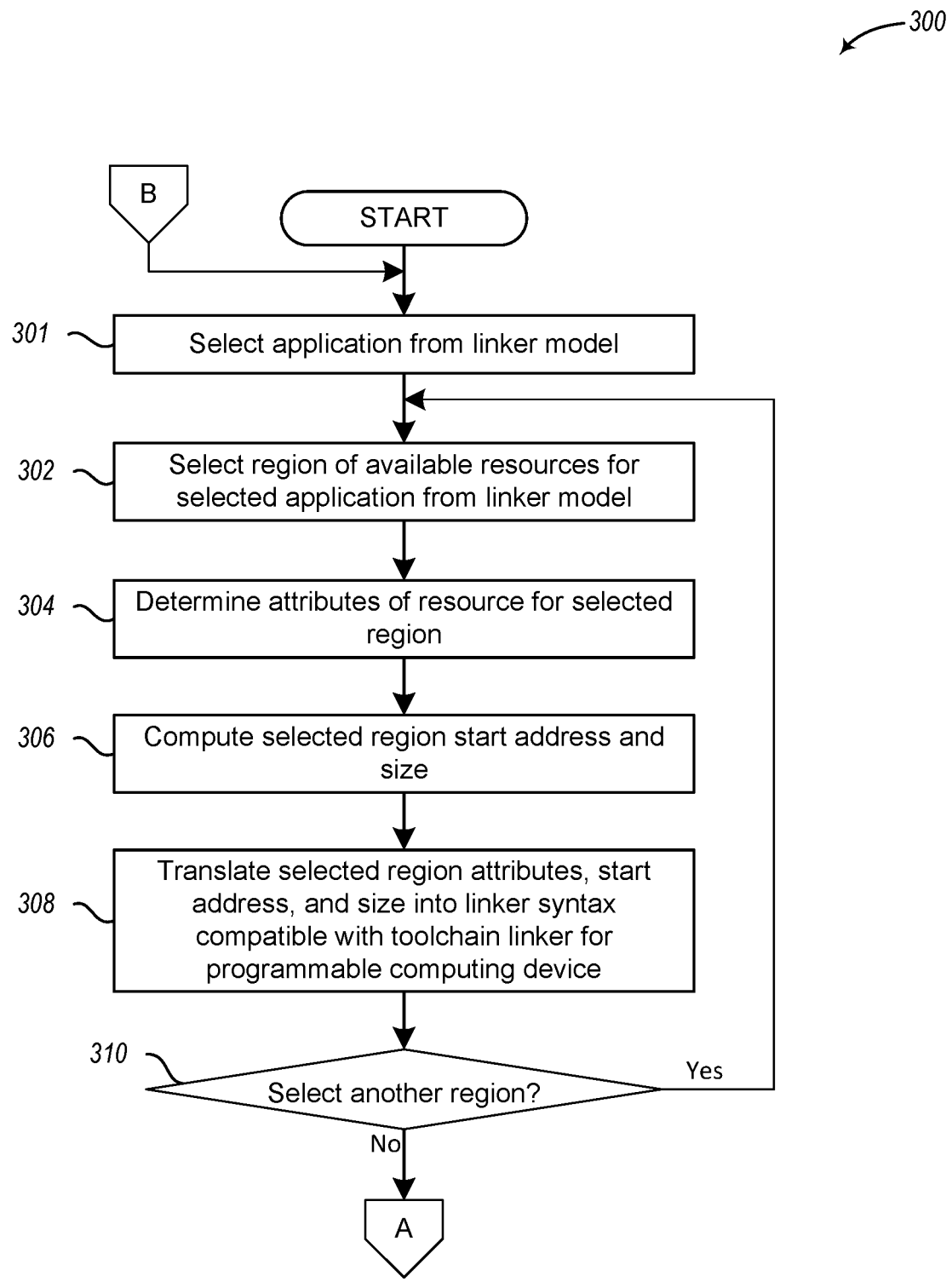
FIGS. 3A-3B show a logical flow diagram of a process for generating linker script from a linker model in accordance with embodiments described herein.
Figure 3B:
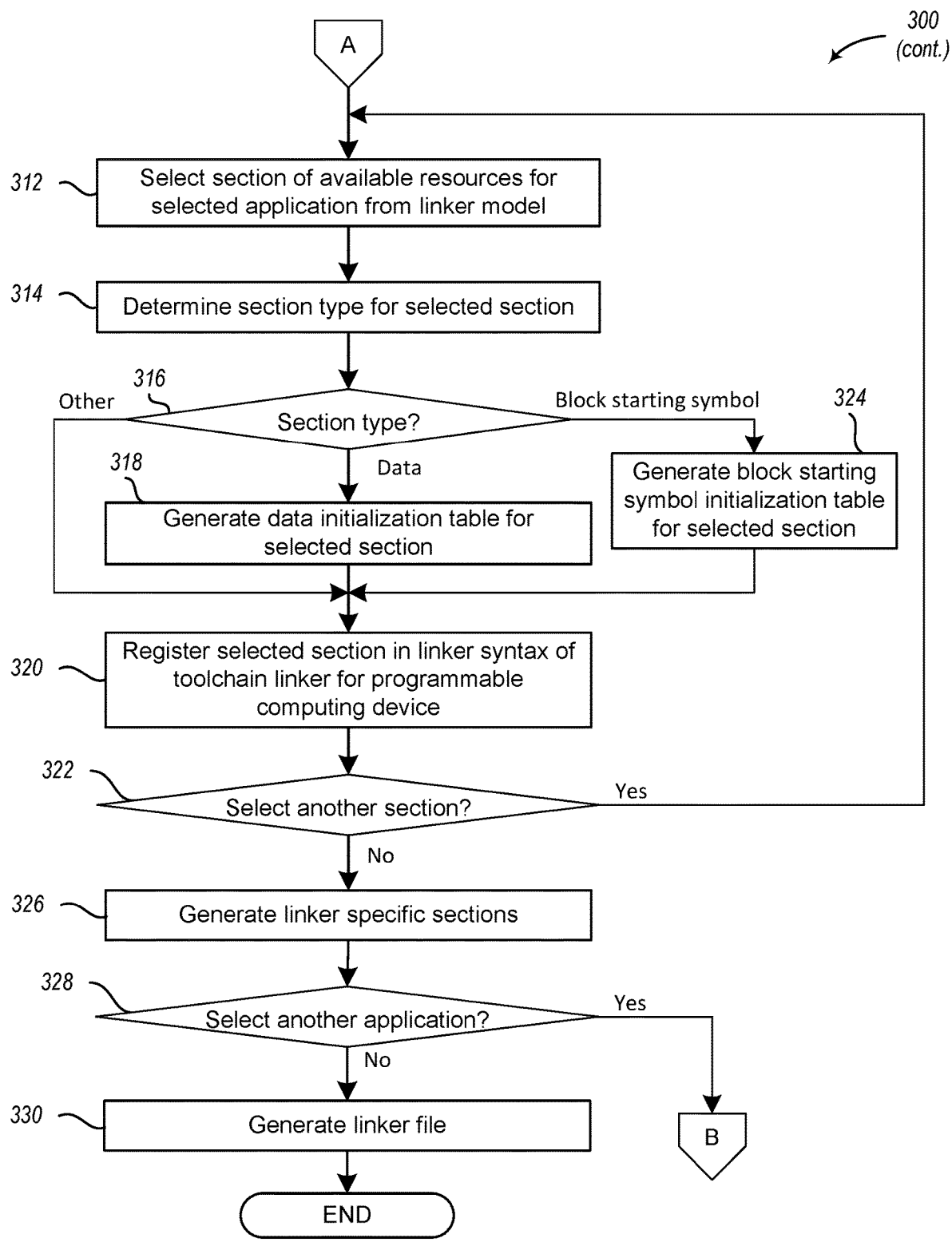

FIGS. 3A-3B show a logical flow diagram of a process 300 for generating linker script from a linker model in accordance with embodiments described herein.

Process 300 begins, after a start block in FIG. 3A, at block 301, where an application is selected from the linker model. As discussed above, memory resources for one or more applications may be defined within the linker model for a programmable computing device.

Process 300 continues next at bock 302, where a region of the available resources for the selected application is selected from the linker model. As discussed above, one or more regions are defined for the available resources. Each defined region may be selected in order and processed.

Process 300 proceeds to block 304, where attributes of the memory resource associated with the selected region are determined. In various embodiments, these attributes may include the type of memory, the access address of the memory, the size of the memory, how much of the memory is available, etc.

Process 300 continues at block 306, where a start address and size of the selected region are computed. In various embodiments, the start address and size of the selected region as computed based on the start address of the available memory associated with the selected region, the size of the available memory (e.g., how much of the memory resource is available to that particular application), the size of the region (e.g., as selected by a user via the graphical user interface), etc.

Process 300 proceeds next to block 308, where the attributes, start address, and size of the selection region are translated into the linker syntax of the toolchain linker for the programmable computing device. In various embodiments, a data structure may store translation information from the linker model to the linker syntax for the programmable computing device. This translation information may define how the attributes of the available memory resources, the start address of the selected region, and the size of the selected region are used to allocate sufficient memory resources for the selected region in accordance with the linker syntax for the toolchain linker for the programmable computing device.

Process 300, continues next at decision block 310, where a determination is made whether another region is selected. Another region is selected until each of the defined regions in the linker model are selected and processed. If another region is to be selected, process 300 loops to block 302; otherwise, process 300 flows to block 312 on FIG. 3B.

At block 312 in FIG. 3B, a section of the available resources for the selected application is selected from the linker model. As discussed above, one or more sections are defined for the available resources. Each defined section may be selected in order and processed. In some embodiments, shared memory resources may be utilized between multiple separate applications.

Process 300 proceeds to block 314, where a section type is determined for the selected section. In various embodiments, the section type is determined based on the definition of the selected section, such as defined by the user via the graphical user interface.

Process 300 continues at decision block 316, where a determination is made regarding the section type of the selected section. If the selected section is for block starting symbol (.bss) data, then process 300 flows to block 324; if the selected section is for data, then process 300 flows to block 318; otherwise, process 300 flows to block 320.

At block 324, block starting symbol initialization table is generated for the selected section. In some embodiments, the block starting symbol initialization table may be generated based on the linker syntax of the programmable computing device. In various embodiments, a data structure may store information identifying how the block starting symbol initialization table is to be generated in the linker syntax of the toolchain linker for the programmable computing device from the linker model. After block 324, process 300 flows to block 320.

At block 318, a data initialization table is generated for the selected section. In some embodiments, the data initialization table may be generated based on the linker syntax of the toolchain linker for the programmable computing device. In various embodiments, a data structure may store information identifying how the data initialization table is to be generated in the linker syntax of the programmable computing device from the linker model. After block 318, process 300 flows to block 320.

At block 320, the selected section is registered in the linker syntax of the toolchain linker for the programmable computing device. In various embodiments, a data structure may store information identifying how the selected section is to be registered or generated in the linker syntax of the toolchain linker for the programmable computing device from the linker model.

Process 300 proceeds next to decision block 322, where a determination is made whether another section is selected. Another section is selected until each of the defined sections in the linker model are selected and processed. If another section is to be selected, process 300 loops to block 312; otherwise, process 300 flows to block 326.

At block 326, linker specific sections are generated for the selected application based on the linker syntax for the toolchain linker for the programmable computing device. In various embodiments, these linker specific sections may include hooks, pointers, descriptors, or other programmable structures to identify the sections in the linker syntax of the toolchain linker for the programmable computing device.

Process 300 continues next at decision block 328, where a determination is made whether another application is selected. Another application is selected until each of the applications defined in the linker model are selected and processed. If another application is to be selected, process 300 loops to block 301 in FIG. 3A to select another application in the linker model; otherwise, process 300 flows to block 330.

At block 330, a linker file in the linker syntax of the toolchain linker for the programmable computing device is generated. In some embodiments, an entry point in the memory resources is generated for each application. A memories list and sections list may also be generated for the linker file in accordance with the linker syntax of the toolchain linker for the programmable computing device.

After block 330, process 300 terminates or otherwise returns to a calling process to perform other actions. In various embodiments, the linker file is provided to the toolchain linker for the programmable computing device for use and deployment by the programmable computing device.

FIGS. 4 and 5A-5B are illustrative examples of linker models generated by a system agnostic toolchain in accordance with embodiments described herein. Example linker model 400 in FIG. 4 includes an AML node 402, memories node 404, and applications node 410. AML node 402 may be referred to as the application memory layout for a plurality of applications to be executed on a programmable computing device (e.g., for a programmable computing device, multiple programmable computing devices, a single type of programmable computing device, multiple types of programmable computing devices, etc.).

The memories node 404 defines the available resources 406 of the programmable computing device. In this example, the available resources 406 include a flash memory 406a, SRAM 406b, and other available memory resources 406c. These available resources are utilized and defined as described herein.

The applications node 410 defines one or more applications 412 that are to be executed on a programmable computing device. For example, applications node 410 may identify a first application 412a, a second application 412b, and other applications 412c. Each application 412 then identifies a regions node 414 and sections node 420 for that application, as described herein. The regions node 414 identifies the specific regions 416a-416c that are defined for application 412a and sections node 420 identifies the specific sections 422a-422h that are defined for application 412a, as described herein. In various embodiments, the regions node 414 may be a sub-part of memories node 404.

The number of memories, applications, regions, and sections identified in example linker model 400 are for illustrative purposes and are not to be limiting.

FIGS. 5A-5B is a class diagram that shows linker model 500 composition. AML node 502 in FIG. 5A includes information identify information regarding the programmable computing device, the applications associated with the linker model 500, etc. In some embodiments, the information included in the AML node 502 may be accessed, pulled, or otherwise obtained from memory node 504 and one or more application nodes 520 (in FIG. 5B). In this illustration, the memories record in AML node 502 is a mapping, using the syntax <string, MEMORY>, where string is the name of the memory and the memory type is described in memory node 504. Similarly, in this illustration, the applications record in AML node 502 is a mapping, using the syntax <string, Application>, where string is the name of the application and the application is described in application node 520 in FIG. 5B.

Memory node 504 includes information identifying the available memory resources for the programmable computing device, which is mapped to AML node 502. Memories node 504 may reference memory type node 506 and offset node 510. The memory type node 506 may include information identifying the types of memories available to the programmable computing device. And the offset node 510 may include information identifying an offset or address for the available memory resources. Accordingly, memory type node 506 is an enumeration of memory types that is used in memory 504 and offset node 510 is an enumeration of offset used in memory 504.

Application node 520 in FIG. 5B includes information identifying the defined regions and section for that application. Although FIG. 5B shows one application node, embodiments are not so limiting and additional application nodes may be added to the linker model 500. In some embodiments, the information included in the application node 520 may be accessed, pulled, or otherwise obtained from one or more region nodes 522 and one or more section nodes 524.

Region node 522 includes information regarding the region defined for the application, as described herein. In this example, region node 522 identifies the name of the region, the memory resource associated with the region, an offset within that memory resource, a size of the region, and a descriptor of the region.

Section node 524 includes information regarding the section defined for the application, as described herein. In this example, section node 524 identifies the name of the section, the section type of the section, the region in which the section is maintained, an identifier indicating from where the data stored in the section is obtained, a size of the section, etc. In some embodiments, the section node 524 may access a section type node 526 and a section initialization node 528 to obtain information regarding the possible section types and initialization options for the section.

The details shown in example linker model 500 are for illustrative purposes and are not to be limiting.

Figure 6:
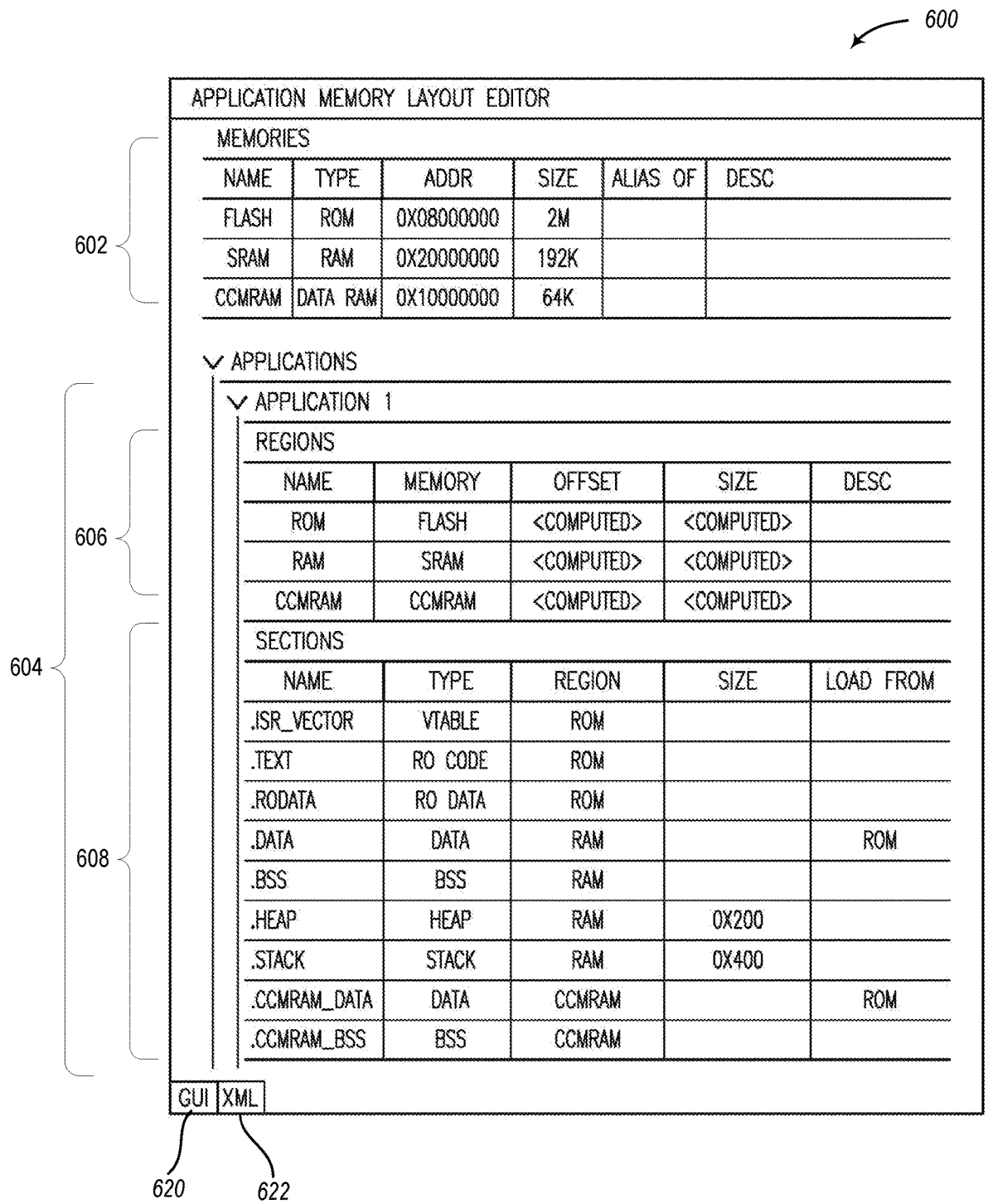

FIGS. 6 and 7A-7B are illustrative examples of graphical user interfaces that enable a user to view, select, and modify memory resource utilization in accordance with embodiments described herein.

Graphical user interface 600 in FIG. 6 may display one or more input interfaces that enable a user view the available memory resources 602 and to define one or more applications 604, as described herein. Moreover, the graphical user interface 600 may enable the user to define the regions 606 and the sections 608 for the application 604, as described herein. The regions 606 may identify the name of the memory resource being utilized, the type of memory resource being utilized, an offset within that memory resource, a size within that memory resource, and a description of the region and it use within the application. The sections 608 may identify a name of the section, a type of the section, the region in with the section is to reside, a size of the section, and where the section is to be loaded from.

In some embodiments, some or all of the region and section information may be input or otherwise provided by the user. In other embodiments, some of the information may be defined by the system based on the application, the user defined information, or some combination thereof. For example, if the user set the size of a section to be larger than the region in which it operates, the graphical user interface 600 may display a warning to the user indicating an invalid memory allocation. Similarly, if the offset and size of one section would overlap with the offset and size of another section, then the graphical user interface 600 may display another warning. In situations where the user does not define a size or offset, the system may automatically select or define the size and offset such that each region and section is a valid memory allocation.

In some embodiments, the user is enabled to view the information in graphical user interface 600 in visual form, as shown, by selecting GUI button 620. In other embodiments, the user is enabled to view the information in graphical user interface 600 in code form by selecting XML button 622. In this way, the user can input data via the visual GUI interface or an XML or code interface.

FIGS. 7A-7B illustrate another example graphical user interface 700 showing a secure application and a non-secure application. The user can define the regions and section for each of those applications, as described herein. The system can employ a consistency checker to ensure that the regions and section defined for non-secure application do not overlap with the regions and section defined for the secure application.

The following is a summarization of the claims as filed.

A method may be summarized as including: receiving a request to use an application on a programmable computing device; determining memory resources available to the programmable computing device; defining one or more regions in the memory resources used by the application; defining one or more sections in the one or more regions for use by the application; generating resource boundaries for the application based on the one or more defined regions and the one or more defined sections; enabling a user to modify the one or more defined regions or the one or more defined sections or the generated resource boundaries; generating a linker model based on the memory resources, the one or more defined regions, the one or more defined sections, and the generated resource boundaries; and generating a linker script for the programmable computing device based on the linker model and a linker syntax compatible with the toolchain linker for the programmable computing device.

The method may include using the linker script to generate the application for deployment on the programmable computing device.

Generating the linker script may include: determining attributes of the memory resources for each region of the one or more regions; computing a start address and a size of each region of the one or more regions; and translating the attributes, the start address, and the size of each region of the one or more regions into the linker syntax compatible with the toolchain linker for the programmable computing device.

Generating the linker script may include: determining a section type for each section of the one or more sections; generating and registering a data initialization table for each section having a data section type in the linker syntax compatible with the toolchain linker for the programmable computing device; generating and registering a block-starting-symbol initialization table for each block-starting-symbol section type in the linker syntax compatible with the toolchain linker for the programmable computing device; and registering each section having another section type in the linker syntax compatible with the toolchain linker for the programmable computing device.

Generating the linker script may include: determining a section type for each section of the one or more sections; and registering each section in the linker syntax compatible with the toolchain linker for the programmable computing device based on the section type for each section.

Generating the linker script may include: determining a section type for each section of the one or more sections; generating a data initialization table for each section having a data section type; and registering the data initialization table for each section having the data section type in the linker syntax compatible with the toolchain linker for the programmable computing device.

Generating the linker script may include: determining a section type for each section of the one or more sections; generating a block-starting-symbol initialization table for each section having a block-starting-symbol section type; and registering the block-starting-symbol initialization table for each section having the block-starting-symbol section type in the linker syntax compatible with the toolchain linker for the programmable computing device.

Generating the linker script may include generating a linker file, including: generating a memories list based on the one or more regions; and generating a sections list based on the one or more sections and the generated boundaries.

The method may include: receiving a second request to use a second application on the programmable computing device; defining one or more second regions in the memory resources used by the second application; defining one or more second sections in the one or more second regions for use by the second application; generating second resource boundaries for the second application based on the one or more defined second regions, the one or more defined second sections, the one or more defined regions for use by the application, the one or more defined sections for use by the application, and the resource boundaries for the application; enabling the user to modify the one or more defined second regions or the one or more defined second sections or the generated second resource boundaries; generating the linker model based on the memory resources, the one or more defined regions for the application, the one or more defined sections for the application, the generated resource boundaries for the application, the one or more defined second regions for the second application, the one or more defined second sections for the second application, and the generated second resource boundaries for the second application; and generating the linker script for the programmable computing device based on the linker model and the linker syntax compatible with the toolchain linker for the programmable computing device.

A computing device may be summarized as including a memory, which, in operation, stores computer instructions and at least one processor, which, in operation, executes the computer instructions to: receive a request to use a first application and a second application on a programmable computing device; determine memory resources available to the programmable computing device; define one or more first regions in the memory resources used by the first application; define one or more first sections in the one or more first regions for use by the first application; define one or more second regions in the memory resources used by the second application; define one or more second sections in the one or more first regions for use by the second application; generate resource boundaries for the first application and the second application based on the one or more first sections and the one or more second sections; modify the resource boundaries in response to receiving at least one user modification to the one or more first sections or the one or more second sections; generate a linker model based on the memory resources, the one or more first regions, the one or more first sections, the one or more second regions, the one or more second sections, and the modified resource boundaries; and generate a linker script for the programmable computing device based on the linker model and a linker syntax compatible with the toolchain linker for the programmable computing device.

The at least one processor, which, in operation, may generate the linker script by executing the computer instructions to: use the linker script to generate the first application and the second application for deployment on the programmable computing device that defines usage of the memory resources by the first application and the second application.

The at least one processor, which, in operation, may generate the linker script by executing the computer instructions to: generate the linker script for the first application, including: determine first attributes of the memory resources for each region of the one or more first regions; compute a first start address and a first size of each region of the one or more first regions; and translate the first attributes, the first start address, and the first size of each region of the one or more first regions into the linker syntax compatible with the toolchain linker for the programmable computing device; and generate the linker script for the second application, including: determine second attributes of the memory resources for each region of the one or more second regions; compute a second start address and a second size of each region of the one or more second regions; and translate the second attributes, the second start address, and the second size of each region of the one or more second regions into the linker syntax compatible with the toolchain linker for the programmable computing device.

The at least one processor, which, in operation, may generate the linker script by executing the computer instructions to: determine a section type for each section of the one or more first sections and for each section of the one or more second sections; and register each section in the linker syntax compatible with the toolchain linker for the programmable computing device based on the section type for each section.

The at least one processor, which, in operation, may generate the linker script by executing the computer instructions to: generate the linker script for the first application, including: determine a section type for each section of the one or more first sections; generate a first data initialization table for each section of the one or more first sections having a data section type; and register the first data initialization table for each section of the one or more first sections having the data section type in the linker syntax compatible with the toolchain linker for the programmable computing device; and generate the linker script for the second application, including: determine the section type for each section of the one or more second sections; generate a second data initialization table for each section of the one or more second sections having the data section type; and register the second data initialization table for each section of the one or more second sections having the data section type in the linker syntax compatible with the toolchain linker for the programmable computing device.

The at least one processor, which, in operation, may generate the linker script by executing the computer instructions to: generate the linker script for the first application, including: determine a section type for each section of the one or more first sections; generate a first block-starting-symbol initialization table for each section of the one or more first sections having a block-starting-symbol section type; and register the first block-starting-symbol initialization table for each section of the one or more first sections having the block-starting-symbol section type in the linker syntax compatible with the toolchain linker for the programmable computing device; and generate the linker script for the second application, including: determine the section type for each section of the one or more second sections; generate a second block-starting-symbol initialization table for each section of the one or more second sections having the block-starting-symbol section type; and register the second block-starting-symbol initialization table for each section of the one or more second sections having the block-starting-symbol section type in the linker syntax compatible with the toolchain linker for the programmable computing device.

The at least one processor, which, in operation, may generate the linker script by executing the computer instructions to: generate a first linker file for the first application, including: generate a first memories list based on the one or more first regions; and generate a first sections list based on the one or more first sections; and generate a second linker file for the second application, including: generate a second memories list based on the one or more second regions; and generate a second sections list based on the one or more second sections.

A non-transitory computer-readable medium may be summarized as having contents that configure a computing device to perform a method, the method may include: receiving a request to employ at least one application on a programmable computing device; determining memory resources available to the programmable computing device; for each corresponding application of the at least one application: defining one or more regions in the memory resources used by the corresponding application; defining one or more sections in the one or more regions for use by the corresponding application; generating resource boundaries for the corresponding application based on the one or more defined regions and the one or more defined sections; enabling a user to modify the one or more defined regions or the one or more defined sections; modifying a linker model based on the one or more defined regions, the one or more defined sections, and the generated resource boundaries; and generating a linker script for the corresponding application to execute on the programmable computing device based on the linker model for the corresponding application and a linker syntax compatible with the toolchain linker for programmable computing device.

The method performed by the execution of the contents may include: compiling and linking each of the at least one application on the programmable computing device by using the linker script to generate each corresponding application for deployment on the programmable computing device.

The method performed by the execution of the contents may include: for each corresponding application: determining a section type for each section of the one or more sections for the corresponding application; and registering each section of the corresponding application in the linker syntax compatible with the toolchain linker for the programmable computing device based on the section type for each section of the corresponding application.

The method performed by the execution of the contents may include: generating a linker file for each corresponding application, including: generating a memories list based on the one or more regions for the corresponding application; and generating a sections list based on the one or more sections and the generated boundaries for the corresponding application.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

The headings and Abstract of the Disclosure provided herein are for convenience only and do not limit or interpret the scope or meaning of the embodiments. And the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving a request to use an application on a programmable computing device;
   determining memory resources available to the programmable computing device;
   defining one or more regions in the memory resources used by the application;
   defining one or more sections in the one or more regions for use by the application;
   generating resource boundaries for the application based on the one or more defined regions and the one or more defined sections;
   enabling a user to modify the one or more defined regions or the one or more defined sections or the generated resource boundaries;
   generating a linker model based on the memory resources, the one or more defined regions, the one or more defined sections, and the generated resource boundaries; and
   generating a linker script for the programmable computing device based on the linker model and a linker syntax compatible with a toolchain linker for the programmable computing device.

2. The method of claim 1, comprising:
   using the linker script to generate the application for deployment on the programmable computing device.

3. The method of claim 1, wherein generating the linker script comprises:
   determining attributes of the memory resources for each region of the one or more regions;
   computing a start address and a size of each region of the one or more regions; and
   translating the attributes, the start address, and the size of each region of the one or more regions into the linker syntax compatible with the toolchain linker for the programmable computing device.

4. The method of claim 1, wherein generating the linker script comprises:
   determining a section type for each section of the one or more sections;
   generating and registering a data initialization table for each section having a data section type in the linker syntax compatible with the toolchain linker for the programmable computing device;
   generating and registering a block-starting-symbol initialization table for each block-starting-symbol section type in the linker syntax compatible with the toolchain linker for the programmable computing device; and
   registering each section having another section type in the linker syntax compatible with the toolchain linker for the programmable computing device.

5. The method of claim 1, wherein generating the linker script comprises:
   determining a section type for each section of the one or more sections; and
   registering each section in the linker syntax compatible with the toolchain linker for the programmable computing device based on the section type for each section.

6. The method of claim 1, wherein generating the linker script comprises:
   determining a section type for each section of the one or more sections;
   generating a data initialization table for each section having a data section type; and
   registering the data initialization table for each section having the data section type in the linker syntax compatible with the toolchain linker for the programmable computing device.

7. The method of claim 1, wherein generating the linker script comprises:
   determining a section type for each section of the one or more sections;
   generating a block-starting-symbol initialization table for each section having a block-starting-symbol section type; and
   registering the block-starting-symbol initialization table for each section having the block-starting-symbol section type in the linker syntax compatible with the toolchain linker for the programmable computing device.

8. The method of claim 1, wherein generating the linker script comprises:
   generating a linker file, including:
      generating a memories list based on the one or more regions; and
      generating a sections list based on the one or more sections and the generated boundaries.

9. The method of claim 1, comprising:
   receiving a second request to use a second application on the programmable computing device;
   defining one or more second regions in the memory resources used by the second application;
   defining one or more second sections in the one or more second regions for use by the second application;
   generating second resource boundaries for the second application based on the one or more defined second regions, the one or more defined second sections, the one or more defined regions for use by the application, the one or more defined sections for use by the application, and the resource boundaries for the application;
   enabling the user to modify the one or more defined second regions or the one or more defined second sections or the generated second resource boundaries;
   generating the linker model based on the memory resources, the one or more defined regions for the application, the one or more defined sections for the application, the generated resource boundaries for the application, the one or more defined second regions for the second application, the one or more defined second sections for the second application, and the generated second resource boundaries for the second application; and
   generating the linker script for the programmable computing device based on the linker model and the linker syntax compatible with the toolchain linker for the programmable computing device.

10. A computing device, comprising:
a memory, which, in operation, stores computer instructions; and
at least one processor, which, in operation, executes the computer instructions to:
receive a request to use a first application and a second application on a programmable computing device;
determine memory resources available to the programmable computing device;
define one or more first regions in the memory resources used by the first application;
define one or more first sections in the one or more first regions for use by the first application;
define one or more second regions in the memory resources used by the second application;
define one or more second sections in the one or more first regions for use by the second application;
generate resource boundaries for the first application and the second application based on the one or more first sections and the one or more second sections;
modify the resource boundaries in response to receiving at least one user modification to the one or more first sections or the one or more second sections;
generate a linker model based on the memory resources, the one or more first regions, the one or more first sections, the one or more second regions, the one or more second sections, and the modified resource boundaries; and
generate a linker script for the programmable computing device based on the linker model and a linker syntax compatible with a toolchain linker for the programmable computing device.

11. The computing device of claim 10, wherein the at least one processor, which, in operation, executes the computer instructions to:
use the linker script to generate the first application and the second application for deployment on the programmable computing device that defines usage of the memory resources by the first application and the second application.

12. The computing device of claim 10, wherein the at least one processor, which, in operation, generates the linker script by executing the computer instructions to:
generate the linker script for the first application, including:
determine first attributes of the memory resources for each region of the one or more first regions;
compute a first start address and a first size of each region of the one or more first regions; and
translate the first attributes, the first start address, and the first size of each region of the one or more first regions into the linker syntax compatible with the toolchain linker for the programmable computing device; and
generate the linker script for the second application, including:
determine second attributes of the memory resources for each region of the one or more second regions;
compute a second start address and a second size of each region of the one or more second regions; and
translate the second attributes, the second start address, and the second size of each region of the one or more second regions into the linker syntax compatible with the toolchain linker for the programmable computing device.

13. The computing device of claim 10, wherein the at least one processor, which, in operation, generates the linker script by executing the computer instructions to:
determine a section type for each section of the one or more first sections and for each section of the one or more second sections; and
register each section in the linker syntax compatible with the toolchain linker for the programmable computing device based on the section type for each section.

14. The computing device of claim 10, wherein the at least one processor, which, in operation, generates the linker script by executing the computer instructions to:
generate the linker script for the first application, including:
determine a section type for each section of the one or more first sections;
generate a first data initialization table for each section of the one or more first sections having a data section type; and
register the first data initialization table for each section of the one or more first sections having the data section type in the linker syntax compatible with the toolchain linker for the programmable computing device; and
generate the linker script for the second application, including:
determine the section type for each section of the one or more second sections;
generate a second data initialization table for each section of the one or more second sections having the data section type; and
register the second data initialization table for each section of the one or more second sections having the data section type in the linker syntax compatible with the toolchain linker for the programmable computing device.

15. The computing device of claim 10, wherein the at least one processor, which, in operation, generates the linker script by executing the computer instructions to:
generate the linker script for the first application, including:
determine a section type for each section of the one or more first sections;
generate a first block-starting-symbol initialization table for each section of the one or more first sections having a block-starting-symbol section type; and
register the first block-starting-symbol initialization table for each section of the one or more first sections having the block-starting-symbol section type in the linker syntax compatible with the toolchain linker for the programmable computing device; and
generate the linker script for the second application, including:
determine the section type for each section of the one or more second sections;
generate a second block-starting-symbol initialization table for each section of the one or more second sections having the block-starting-symbol section type; and
register the second block-starting-symbol initialization table for each section of the one or more second sections having the block-starting-symbol section type in the linker syntax compatible with the toolchain linker for the programmable computing device.

16. The computing device of claim 10, wherein the at least one processor, which, in operation, generates the linker script by executing the computer instructions to:
generate a first linker file for the first application, including:
generate a first memories list based on the one or more first regions; and
generate a first sections list based on the one or more first sections; and
generate a second linker file for the second application, including:
generate a second memories list based on the one or more second regions; and
generate a second sections list based on the one or more second sections.

17. A non-transitory computer-readable medium having contents that configure a computing device to perform a method, the method comprising:
receiving a request to employ at least one application on a programmable computing device;
determining memory resources available to the programmable computing device;
for each corresponding application of the at least one application:
defining one or more regions in the memory resources used by the corresponding application;
defining one or more sections in the one or more regions for use by the corresponding application;
generating resource boundaries for the corresponding application based on the one or more defined regions and the one or more defined sections;
enabling a user to modify the one or more defined regions or the one or more defined sections;
modifying a linker model based on the one or more defined regions, the one or more defined sections, and the generated resource boundaries; and
generating a linker script for the corresponding application to execute on the programmable computing device based on the linker model for the corresponding application and a linker syntax compatible with a toolchain linker for the programmable computing device.

18. The non-transitory computer-readable medium of claim 17, wherein the method comprises:
compiling and linking each of the at least one application on the programmable computing device by using the linker script to generate each corresponding application for deployment on the programmable computing device.

19. The non-transitory computer-readable medium of claim 17, wherein the method comprises:
for each corresponding application:
determining a section type for each section of the one or more sections for the corresponding application; and
registering each section of the corresponding application in the linker syntax compatible with the toolchain linker for the programmable computing device based on the section type for each section of the corresponding application.

20. The non-transitory computer-readable medium of claim 17, wherein the method comprises:
generating a linker file for each corresponding application, including:
generating a memories list based on the one or more regions for the corresponding application; and
generating a sections list based on the one or more sections and the generated boundaries for the corresponding application.

* * * * *